United States Patent
Ishikawa et al.

(10) Patent No.: US 6,640,180 B2
(45) Date of Patent: Oct. 28, 2003

(54) ANTISKID BRAKE CONTROL SYSTEM

(75) Inventors: Atsushi Ishikawa, Kawasaki (JP); Gen Inoue, Kanagawa (JP); Nobuyuki Ohtsu, Kanagawa (JP)

(73) Assignee: Unisia Jecs Corporation, Atsugi (JP)

( * ) Notice: Subject to any disclaimer, the term of this patent is extended or adjusted under 35 U.S.C. 154(b) by 0 days.

(21) Appl. No.: 10/127,559

(22) Filed: Apr. 23, 2002

(65) Prior Publication Data

US 2002/0156567 A1 Oct. 24, 2002

(30) Foreign Application Priority Data

Apr. 23, 2001 (JP) ........................................ 2001-124519

(51) Int. Cl.$^7$ ................................................ G06F 7/00
(52) U.S. Cl. .......................................... 701/74; 701/70
(58) Field of Search ............................. 701/70, 71, 74, 701/75, 78, 82; 303/10, 11, 121

(56) References Cited

U.S. PATENT DOCUMENTS 5,225,983 A * 7/1993 Ohmura et al. ............... 701/48

FOREIGN PATENT DOCUMENTS

JP          09107698 A * 4/1997 ........... H02P/15/00

* cited by examiner

Primary Examiner—Yonel Beaulieu
(74) Attorney, Agent, or Firm—Foley & Lardner

(57) ABSTRACT

In an antiskid brake control system, an ECU is constructed to calculate a pseudo vehicle-body speed in accordance with a sensed wheel speed, calculate a target wheel speed in view of a predetermined slip ratio obtained in accordance with a calculated pseudo vehicle-body speed, carry out pressure reducing control by reducing the fluid pressure within a hydraulic unit when the sensed wheel speed is smaller than the calculated target wheel speed, estimate an amount of fluid stored in a reservoir, and correct the target wheel speed to lessen the slip ratio when the estimated fluid amount is greater than a predetermined value.

15 Claims, 14 Drawing Sheets

ANTISKID BRAKE CONTROL SYSTEM

CROSS-REFERENCE TO RELATED APPLICATIONS

This application claims the benefit of and priority to Japanese Patent Application P2001-124519, filed on Apr. 23, 2001, the entire contents of which is incorporated hereby by reference.

BACKGROUND OF THE INVENTION

The present invention relates to antiskid brake control systems for motor vehicles for preventing wheel lock by increasing or decreasing the fluid pressures within wheel cylinders of vehicle wheels during braking, and more particularly, to technique of controlling the empty capacity of a reservoir for storing working fluid discharged from the wheel cylinders during pressure reducing control of the brake fluid pressure.

In typical technique of controlling the empty capacity of the reservoir in the antiskid brake control systems, drive-current control of an electric motor for driving a hydraulic pump for circulating working fluid stored in the reservoir to a master cylinder is carried out with a pulse width modulation (PWM) control output to make an electric motor output or number of revolutions controllable. And the amount of working fluid in the reservoir is estimated, wherein when the estimated amount becomes larger, the motor output is increased, whereas when it becomes smaller, the motor output is decreased, maintaining the empty capacity of the reservoir at a given value or more, thus allowing achievement of sufficient pressure reduction.

However, typical technique of controlling the empty capacity of the reservoir needs a large electric motor with controllable current as described above, leading to difficult reduction in size of the system with cost increase thereof. Further, the large electric motor requires heavy current to increase a motor output, resulting in feel degradation in terms of acoustic vibration performance. Furthermore, achievement of PWM control needs countermeasures against radio noise, resulting in complicated circuit configuration and enlarged size of a control unit itself due to arrangement of a radiating plate for eliminating heat generated in transistors.

SUMMARY OF THE INVENTION

It is, therefore, an object of the present invention to provide antiskid brake control systems which allow control of the empty capacity of the reservoir with reduction in manufacturing cost and size of the system, and prevention of degradation in acoustic vibration performance without generating radio noise, nor enlarging the control unit.

The present invention provides generally a brake control system for a motor vehicle, which comprises: a sensor which senses a speed of a corresponding one of wheels; a hydraulic unit which allows increase and reduction in a fluid pressure within a wheel cylinder provided to the wheel, the hydraulic unit comprising a reservoir for storing a fluid discharge from the wheel cylinder during pressure reduction; and an electronic control unit (ECU) connected to the sensor and the hydraulic unit, the ECU being so constructed as to: calculate a pseudo vehicle-body speed in accordance with the sensed wheel speed; calculate a target speed of the wheel in view of a predetermined slip ratio obtained in accordance with the calculated pseudo vehicle-body speed; carry out a pressure reducing control by reducing the fluid pressure within the hydraulic unit when the sensed wheel speed is smaller than the calculated target wheel speed; estimate an amount of the fluid stored in the reservoir; and correct the target wheel speed to lessen the slip ratio when the estimated fluid amount is greater than a predetermined value.

BRIEF DESCRIPTION OF THE DRAWINGS

The other objects and features of the present invention will become apparent from the following description with reference to the accompanying drawings, wherein.

DETAILED DESCRIPTION OF THE INVENTION

Figure 1:
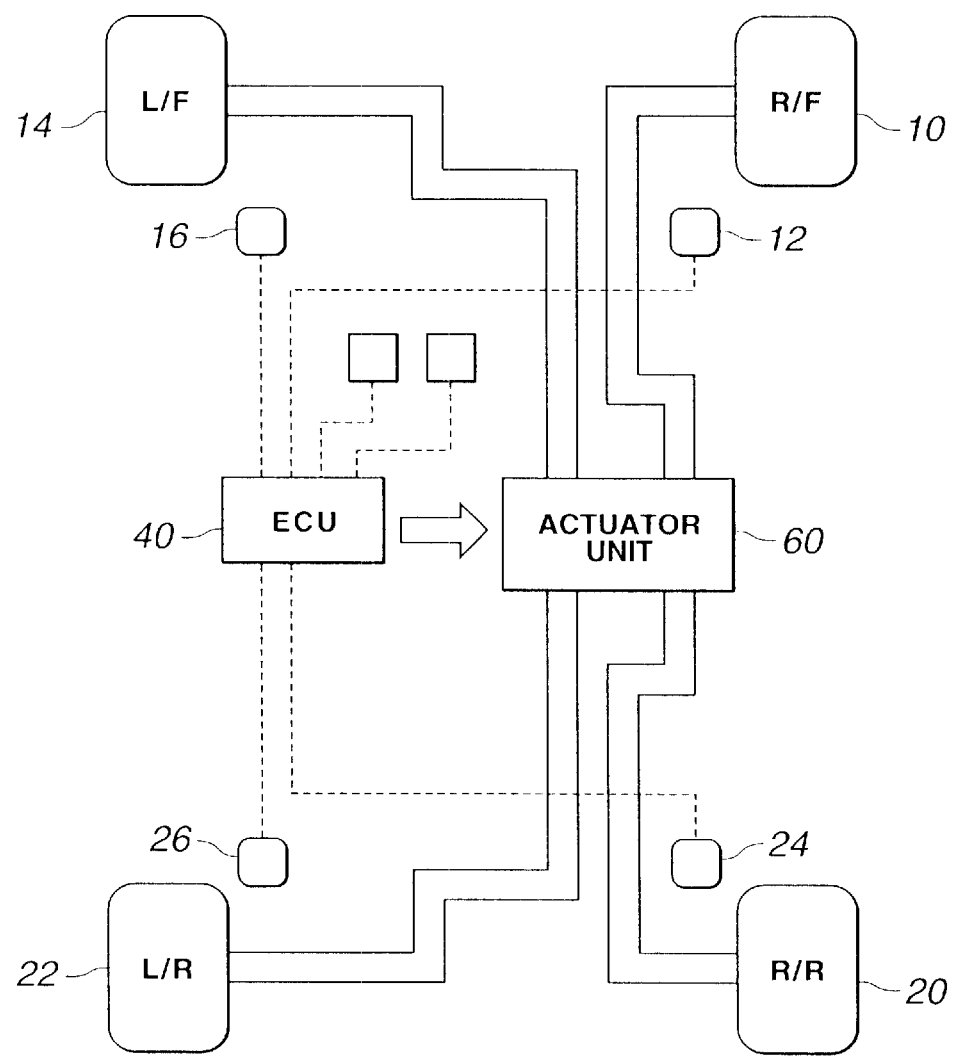
FIG. 1 is a schematic drawing showing a first embodiment of an antiskid brake control system according to the present invention.

Referring to the drawings, a description will be made with regard to an antiskid brake control system embodying the present invention.

Referring to FIG. 1, the configuration of a first embodiment of an antiskid brake control system will be described. A motor vehicle comprises wheel-speed sensors or wheel-speed sensing means 12, 16 which generate wheel-speed pulses in accordance with rotations of right-front and left-front wheels 10, 14 as steered or driven wheels, respectively, and wheel-speed sensors or wheel-speed sensing means 24, 26 which generate wheel-speed pulses in accordance with rotations of right-rear and left-rear wheels 20, 22 as driving wheels, respectively. These sensors are connected to an electronic control unit (ECU) 40 comprising a microcomputer.

Figure 2:
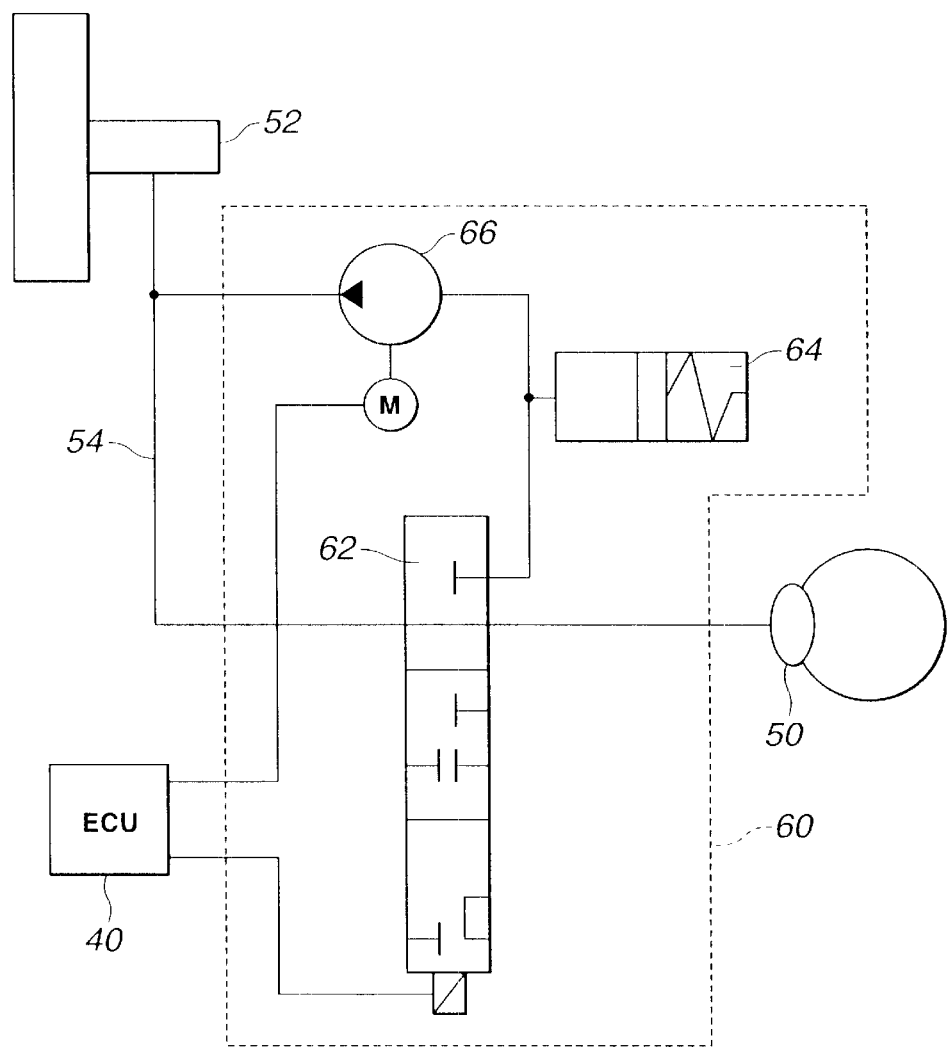
FIG. 2 is a diagram showing a brake fluid-pressure circuit in the antiskid brake control system.

Referring also to FIG. 2, a wheel cylinder or braking cylinder 50 provided to each wheel and a master cylinder 52 for generating the brake fluid pressure by operation of a brake pedal depressed by a driver communicate with each other through a main fluid passage 54. An actuator unit 60 is arranged in main fluid passage 54 to control the fluid pressure within cylinder 50. Although FIG. 2 merely illustrates one brake fluid-pressure circuit and one wheel, two brake fluid-pressure circuits are actually connected to mater cylinder 52, wherein one is connected to wheel cylinders 50, 50 of right-front and left-rear wheels 10, 22, and another is connected to wheel cylinders 50, 50 of left-front and right-rear wheels 14, 20.

Actuator unit 60 comprises a switching valve or switching means 62 for switching an increase and reduction in the fluid pressure within wheel cylinder 50, a reservoir 64 for storing brake fluid of wheel cylinder 50 during pressure reducing control thereof, a hydraulic pump 66 for returning brake fluid stored in reservoir 64 to main fluid passage 54, and an electric motor M for driving hydraulic pump 66. Reservoir 64 is provided with each of the two brake fluid-pressure circuits. ECU or brake fluid-pressure controlling means 40 comprises a hydraulic-pump drive circuit or hydraulic-pump driving means for carrying out ON-OFF switching of a relay for driving motor M.

Figure 3:
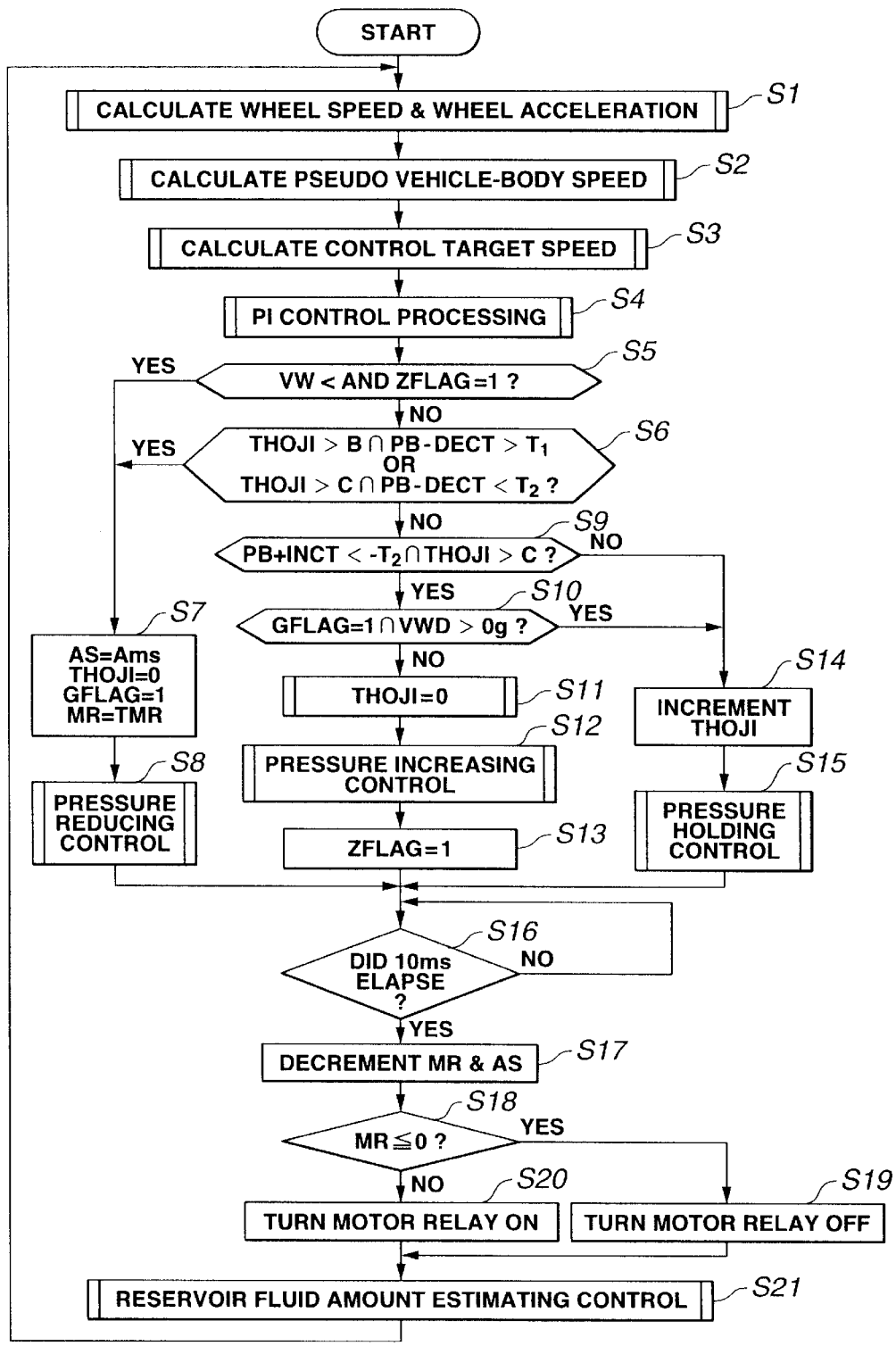
FIG. 3 is a flow chart showing the contents of fundamental control executed in an electronic control unit (ECU)

Referring to FIG. 3, the contents of fundamental control executed in ECU 40 will be described. First, at a step S1, wheel speeds WV of right-front, left-front, right-rear, and left-rear wheels 10, 14, 20, 22 are calculated in accordance with outputs of wheel-speed sensors 12, 16, 24, 26, and a wheel acceleration WVD is calculated by differentiation of the wheel speeds WV.

At a subsequent step S2, a pseudo vehicle speed or pseudo vehicle-body speed VI is calculated in accordance with wheel speeds WV calculated at step S1. The contents of calculation of pseudo vehicle-body speed VI will be described in detail later with reference to FIGS. 4–5.

At a subsequent step S3, a control target speed or pressure reduction determination threshold value WVS is calculated in accordance with pseudo vehicle-body speed VI calculated at step S2. The contents of calculation of control target speed WVS will be described in detail later with reference to FIG. 6.

At a subsequent step S4, proportional integral (PI) control processing is carried out. Specifically, a target pressure increase/reduction pulse time PB is computed which is indicative of a target pressure increase/reduction control time for brake fluid. The contents of PI control processing will be described in detail later with reference to FIG. 7.

At a subsequent step S5, it is determined whether or not wheel speed WV of each wheel calculated at step S1 is smaller than control target speed WVS calculated at step S3, and a pressure increase execution flag ZFLAG indicative of execution of pressure increasing control is set at 1. If the answer is YES, i.e. WV<WVS and ZFLAG=1, pressure reducing control is needed, so that flow proceeds to a step S7.

At step S7, after carrying out the following processings, flow proceeds to a step S8 for brake fluid-pressure reducing control.

A pressure reducing control execution time AS is set at a predetermined time A;

A pressure holding control time THOJI is set at zero;

A pressure reduction execution flag GFLAG is set at 1; and

A motor actuation signal timer MR is set at a motor actuation time set value TMR.

At step S8, brake fluid-pressure reducing control is carried out. Specifically, ECU 40 outputs a switching signal to switching valve 62 of actuator 60 to achieve communication between master cylinder 52, wheel cylinder 50, and reservoir 64.

At step S5, if the answer is NO, i.e. WV≧WVS and ZFLAG=0, flow proceeds to a step S6 for determination of the necessity of brake fluid-pressure reducing control. Specifically, at step S6, it is determined whether or not pressure holding control time THOJI is greater than a predetermined time Bms and a time obtained by subtracting a pressure reduction duration timer DECT from target pressure increase/reduction pulse time PB is greater than a predetermined time $T_1$ ms, or pressure holding control time THOJI is greater than a predetermined time Cms (B<C) and a time obtained by subtracting pressure reduction duration timer DECT from target pressure increase/reduction pulse time PB is greater than a predetermined time $T_2$ ms ($T_2$<$T_1$). If the answer is YES, i.e. any of the two conditions holds, execution of pressure reducing control is needed, so that flow proceeds to step S7.

At step S6, if the answer is NO, i.e. both conditions do not hold, flow proceeds to a step S9 for determination of the necessity of brake fluid-pressure increasing or holding control. Specifically, at step S9, it is determined whether or not a time obtained by adding target pressure increase/reduction pulse time PB to a pressure increase duration timer INCT is smaller than a predetermined time $-T_2$ms, and pressure holding control time THOJI is greater than predetermined time Cms. If the answer is YES, i.e. both conditions hold, it can be determined that wheel slip does not occur yet, so that flow proceeds to a step S10.

At step S10, it is determined whether or not pressure reduction execution flag GFLAG indicative of execution of pressure reducing control is set at 1, and wheel acceleration WVD is greater than 0 g. If the answer is NO, i.e. at least one of the two conditions does not hold, the fluid pressure within wheel cylinder 50 is rather insufficient, so that flow proceeds to a step S11 where pressure holding control time THOJI is reset to zero, then, it proceeds to a step S12 for execution of brake-fluid pressure increasing control.

At step S12, brake-fluid pressure increasing control is carried out. Specifically, in this case, switching valve 62 of actuator unit 60 is driven to the position where communication is allowed between master cylinder 52 and wheel cylinder 50. At a subsequent step S13, pressure reduction execution flag GFLAG is set at 1.

If the answer at step S9 is NO, i.e. PB+INCT≦$-T_2$ ms or THOJI≦Cms, or if the answer at step S10 is YES, i.e. GFLAG=1 or WVD≦0 g, flow proceeds to a step S14 where pressure holding control time THOJI is incremented, then, it proceeds to a step S15.

At step S15, brake fluid-pressure holding control is carried out. Specifically, in this case, switching valve 62 is driven to the position where communication of wheel cylinder 50 does not allowed with master cylinder 52 and reservoir 64.

Subsequent to any of steps S8, S13, and S15, flow proceeds to a step S16 where it is determined whether or not 10 ms has elapsed. If the answer is NO, i.e. 10 ms has not elapsed, processing at step S16 is repeatedly carried out, whereas the answer is YES, i.e. 10 ms has elapsed, flow proceeds to a step S17. In other words, the above control routine is executed every 10 ms.

At step S17, motor actuation signal time MR is decremented, and pressure reducing control execution time As is decremented, then, flow proceeds to a step S18 where motor actuation signal time MR is equal to or smaller than zero. If the answer is YES, i.e. MR≦g, flow proceeds to a step S19 where the relay of electric motor M is switched to the OFF state. If the answer is NO, i.e. MR>0, flow proceeds to a step S20 where the relay of motor M is switched to the ON state, then, flow proceeds to a step S21.

At step S21, control for estimating the fluid amount in reservoir 64 is carried out, and one flow is finished and returned to step S1. The contents of reservoir fluid-amount estimating control will be described later with reference to FIG. 10.

Figure 4:
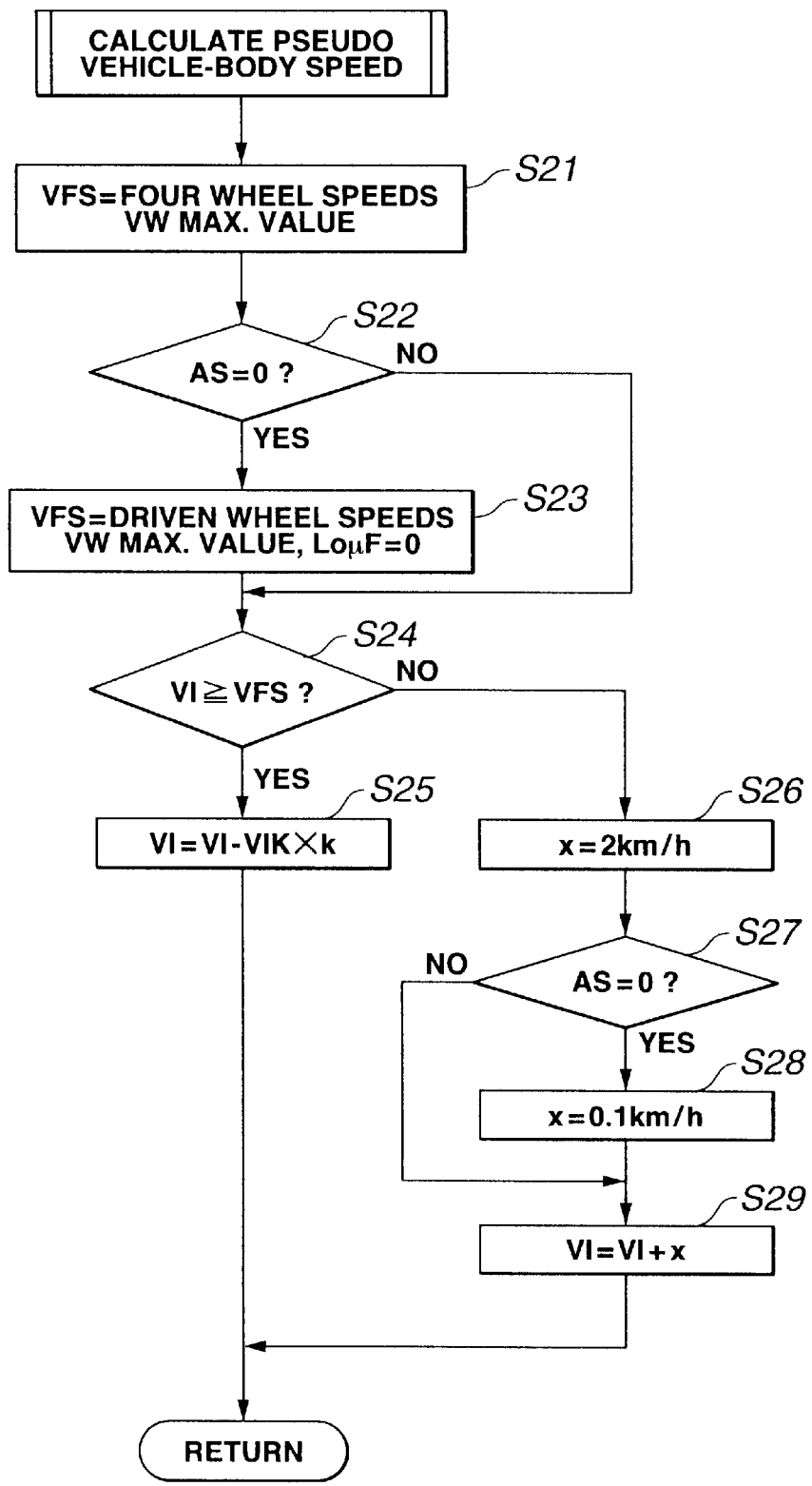
FIG. 4 is a chart similar to FIG. 3, showing the contents of pseudo vehicle-body speed calculation.

Referring to FIG. 4, the specific contents of pseudo vehicle-body speed calculation at step S2 in FIG. 3 will be described. First, at a step S21, the maximum value of wheel speeds WV of the four wheels is set as a wheel-speed select value VFS, then, flow proceeds to a step S22.

At step S22, it is determined whether or not pressure reducing control is not being carried out, i.e. pressure reducing control execution time As is equal to zero. If the answer is YES, i.e. pressure reducing control is not being carried out or AS 0, flow proceeds to a step S23 where the maximum value of wheel speeds WV of the driven wheels is set as wheel-speed select value VFS, then, flow proceeds to a step S24. If the answer is NO, i.e. pressure reducing control is being carried out or AS≠0, flow proceeds to a step S24.

At step S24, it is determined whether or not pseudo vehicle-body speed VI is equal to or greater than wheel-speed select value VFS. If the answer is YES, i.e. VI≧VFS, flow proceeds to a step S25 where pseudo vehicle-body speed VI during vehicle deceleration is obtained using the following formula, and one flow is finished.

$$VI=VI-VIK\times k$$

wherein k is vehicle-body deceleration. The contents of calculation of vehicle-body deceleration VIK will be described later with reference to FIG. 5.

At step S24, if the answer is NO, i.e. VI<VFS, it is determined that the vehicle is accelerating, so that flow proceeds to a step S26 where a deceleration limiter constant "x" is set at 2 km/h, then, flow proceeds to a step S27. At step S27, it is determined again whether or not pressure reducing control is not being carried out, i.e. pressure reducing control execution time As is equal to zero. If the answer is YES, i.e. pressure reducing control is not being carried out or AS=0, flow proceeds to a step S28 where deceleration limiter constant "x" is set at 0.1 km/h, then, it proceeds to a step S29. If the answer is NO, i.e. pressure reducing control is being carried out or AS≠0, flow proceeds to a step S29.

At step S29, pseudo vehicle-body speed VI is obtained using the following formula, and one flow is finished.

$$VI=VI+x$$

Figure 5:
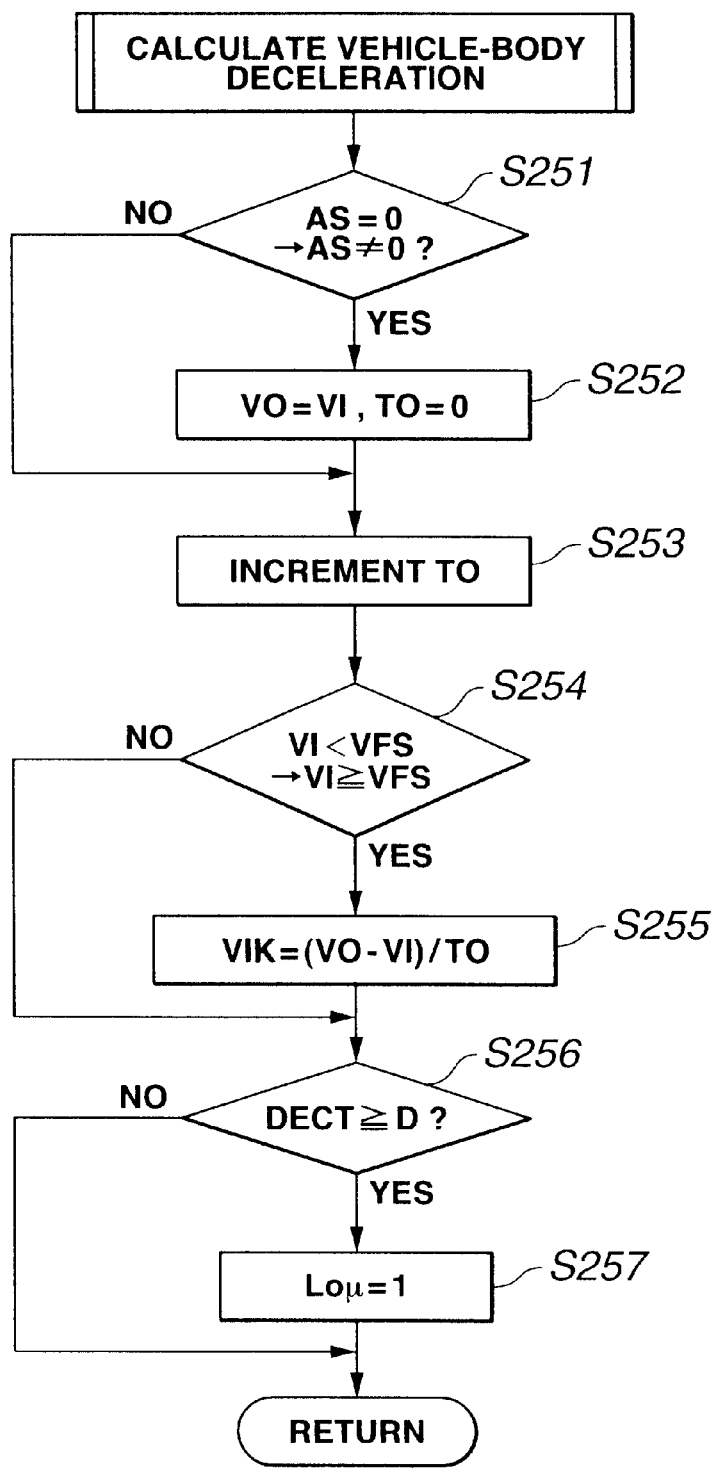
FIG. 5 is a chart similar to FIG. 4, showing the contents of vehicle-body deceleration calculation.

Referring to FIG. 5, the specific contents of vehicle-body deceleration calculation at step S25 in FIG. 4 will be described. First, at a step S251, it is determined whether or not switching takes place from the state where pressure reducing control is not being carried out, i.e. AS=0 to the state where pressure reducing control is carried out, i.e. AS≠0. If the answer is YES, i.e. AS=0, flow proceeds to a step S252 where the vehicle speed at first pressure reducing control or pressure reducing control start vehicle speed VO is set at pseudo vehicle-body speed VI, and a vehicle-deceleration creating timer TO is reset to zero, then, flow proceeds to a step S253. If the answer is NO, i.e. AS≠0, flow proceeds to step S253. At step S253, vehicle-deceleration creating timer TO is incremented, and flow proceeds to a step S254.

At step S254 for spin-up determination, it is determined whether or not wheel-speed select value VFS returns to pseudo vehicle-body speed VI. If the answer is YES, i.e. VI<VFS→VI≧VFS, flow proceeds to a step S255 where vehicle-body deceleration VIK is obtained using the following formula, then, it proceeds to a step S256, whereas if the answer is NO, i.e. VI<VFS, flow proceeds to a step S256.

$$VIK=(VO-VI)/TO$$

At step S256 for low-µ road determination, it is determined whether or not pressure reduction duration DECT is equal to or greater than Dms, i.e. the road is low-µ road. If the answer is YES, i.e. DECT≧Dms=low-µ road, flow proceeds to a step S257 where a low-µ flag LoµF is set at 1, and one flow is finished. If the answer is NO, i.e. DECT<Dms=high-µ road, one flow is finished.

Figure 6:
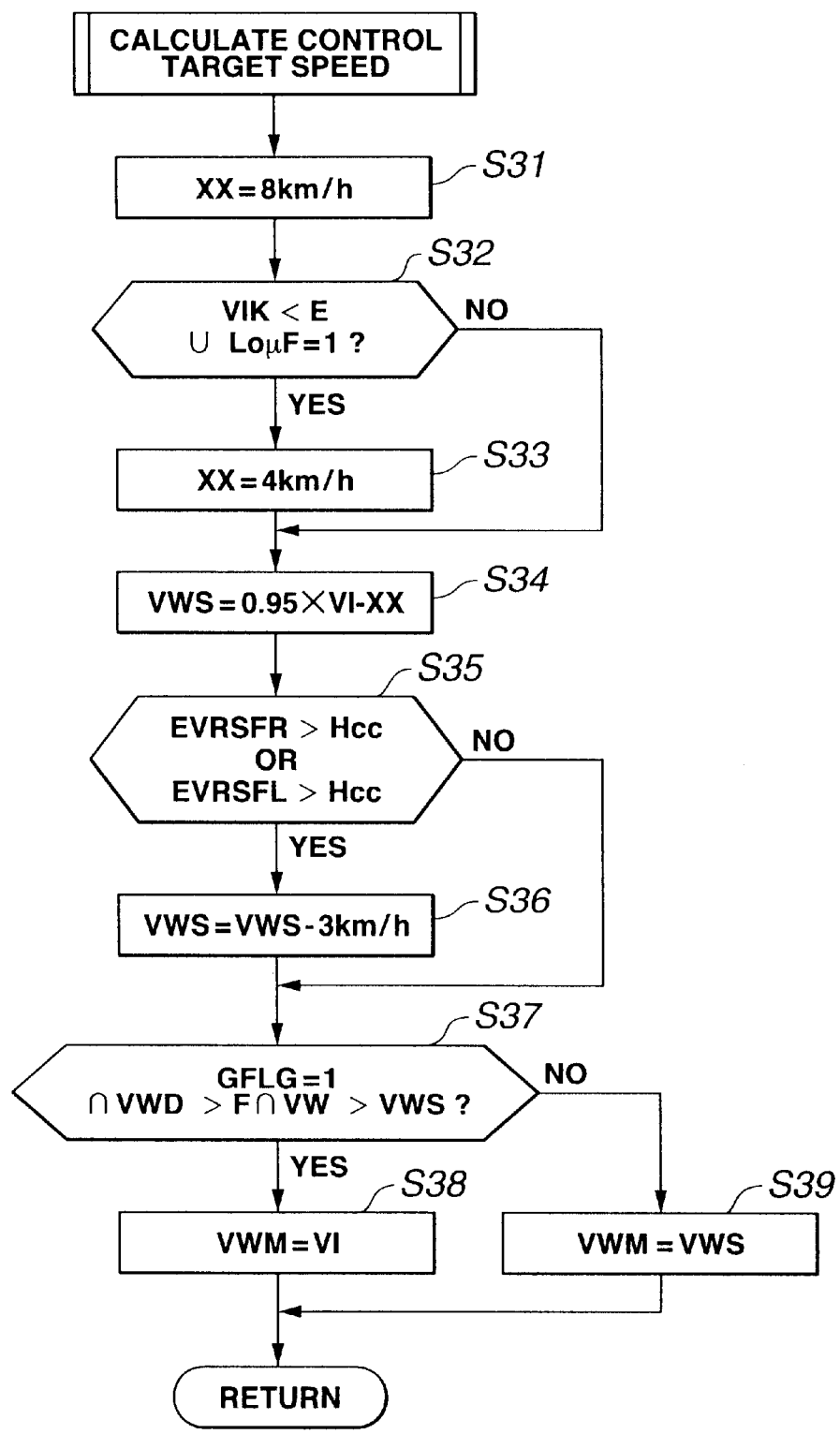
FIG. 6 is a chart similar to FIG. 5, showing the contents of control target speed calculation.

Referring to FIG. 6, the specific contents of control target speed calculation at step S3 in FIG. 3 will be described. At a step S31, an offset value XX of control target speed WVS is set at 8 km/h, and flow proceeds to a step S32.

At step S32, it is determined whether or not vehicle deceleration is smaller than a predetermined value E and low-µ flag LoµF is set at 1, i.e. the road is low-µ road. If the answer is YES, i.e. the road is low-µ road, flow proceeds to a step S33 where offset value XX is set at 4 km/h, then, it proceeds to a step S34. If the answer is NO, i.e. the road is high-µ road, flow proceeds to step S34 with offset value XX being set at 8 km/h.

At step S34, control target speed WVS is computed in accordance with pseudo vehicle-body speed VI calculated in processing in FIG. 4 and offset value XX using the following formula, and flow proceeds to a step S35.

$$WVS=0.95\times VI-XX$$

At step S35, it is determined whether or not any of an estimated fluid amount EFRSFR of one reservoir 64 and an estimated fluid amount EVRSFL of another reservoir 64 is greater than a predetermined amount Hcc. If the answer is YES, i.e. EVRSFR>Hcc or EVRSFL>Hcc, the empty capacity of the reservoir is small, so that flow proceeds to a step S36 where control target speed WVS is set at a value obtained by subtracting 3 km.h from control target speed WVS. If the answer is NO, i.e. EVRSFR≦Hcc or EVRSFL≦Hcc, the empty capacity of the reservoir is still sufficient, flow proceeds to a step S37.

At step S37, it is determined whether or not pressure reduction flag GFLAG is set at 1, wheel acceleration WVD is greater than a predetermined value F, and wheel speed WV is greater than control target speed WVS. If the answer is YES, flow proceeds to a step S38 where a target slip vehicle speed WVM is set at pseudo vehicle-body speed VI, whereas if the answer is NO, flow proceeds to a step S39 where target slip vehicle speed WVM is set at control target speed WVS, and one flow is finished.

Figure 7:
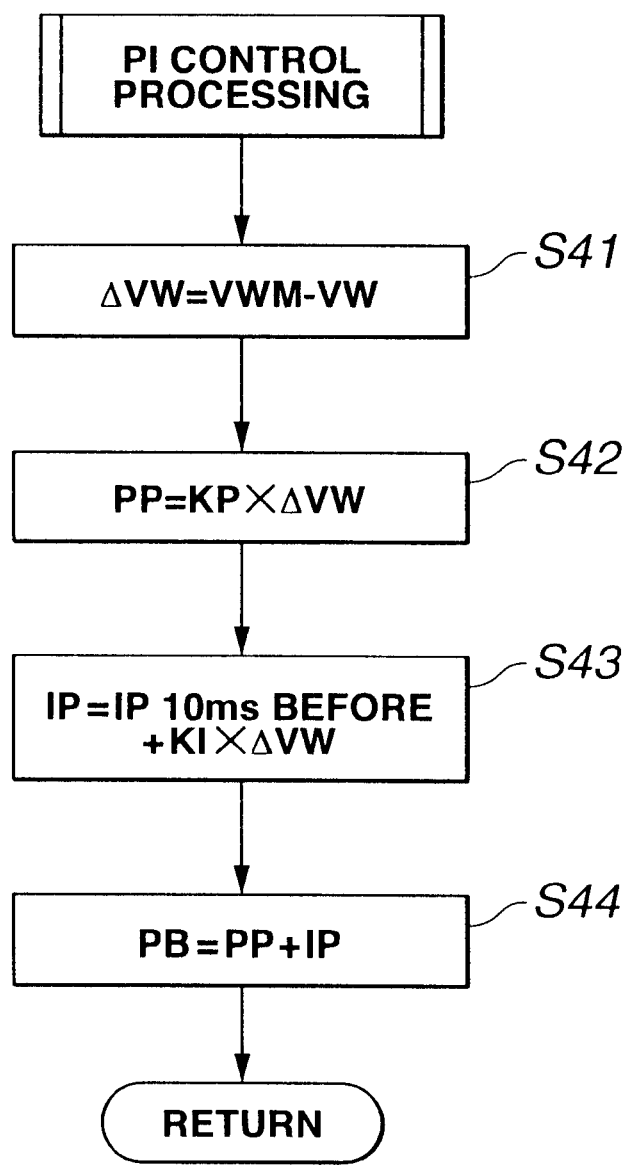
FIG. 7 is a chart similar to FIG. 6, showing the contents of proportional integral (PI) control processing.

Referring to FIG. 7, the specific contents of P1 control processing at step S4 in FIG. 3 will be described. First, at step S41, a deviation AWV is obtained using the following formula.

$$\Delta WV=WVM-WV$$

At a subsequent step S42, a proportional part PP of P1 control is obtained using the following formula.

$$PP=KP\times\Delta WV$$

At a subsequent step S43, an integral part IP of PI control is obtained using the following formula.

$$IP=10 \text{ ms before } IP+KI\times\Delta WV$$

where K1 is a coefficient.

At a subsequent step S44, target pressure increase/reduction pulse time PB is obtained using the following formula, and one flow is finished.

$$PB=PP+IP$$

Figure 8:
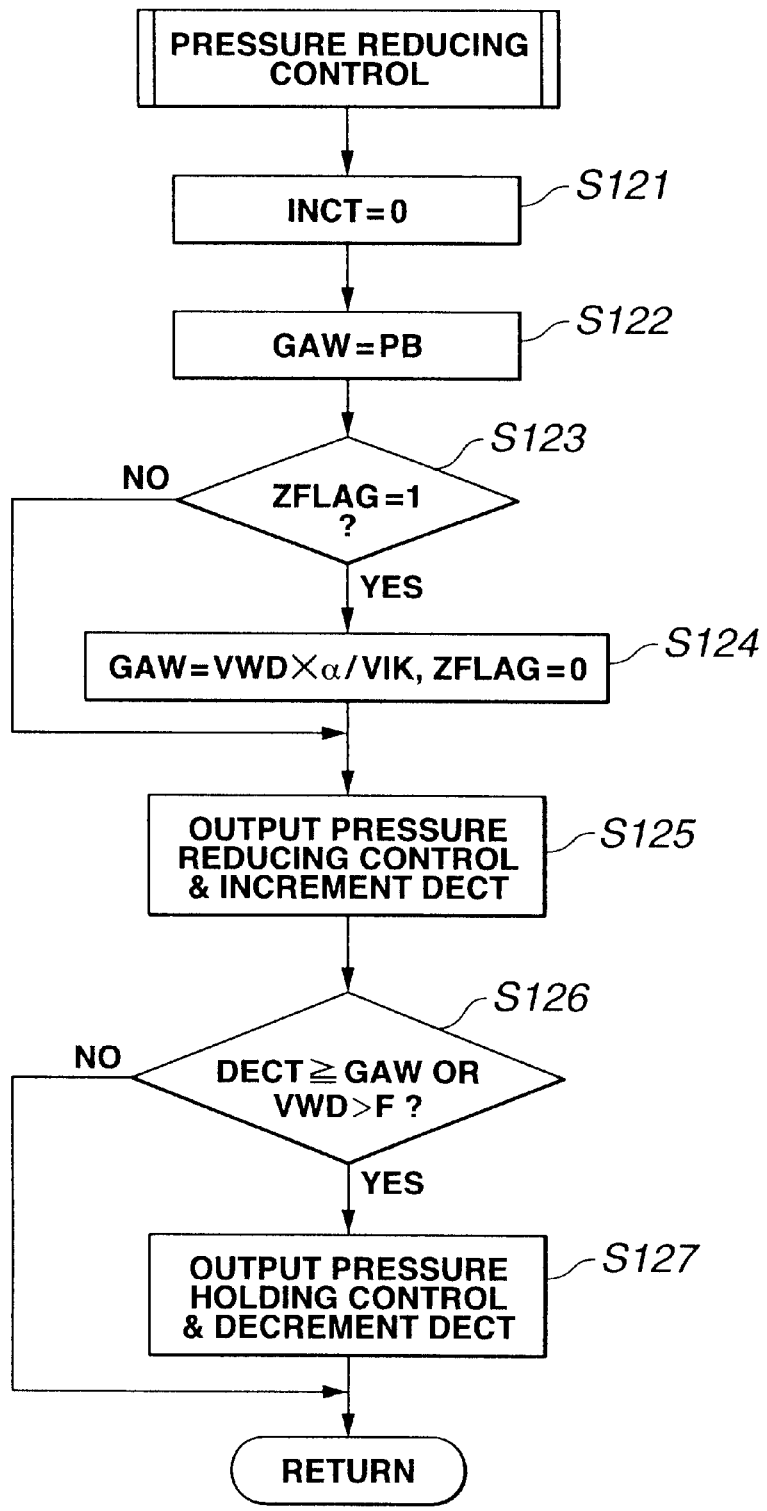
FIG. 8 is a chart similar to FIG. 7, showing the contents of pressure reducing control.

Referring to FIG. 8, the specific contents of pressure reducing control at step S12 in FIG. 3 will be described. First, at a step S121, pressure increase duration timer INCT is reset to zero. At a subsequent step S122, a pressure reduction pulse time GAW is set at target pressure increase/reduction pulse time PB, then, flow proceeds to a step S123.

At step S123, it is determined whether or not pressure increase execution flag ZFLAG is set at 1. If the answer is YES, i.e. ZFLAG=1, flow proceeds to a step S124 where pressure reduction pulse time GAW is obtained using the following formula, and pressure increase execution flag ZFLAG is reset to zero, then, flow proceeds to a step S125.

$$GAW=WVD \times \alpha/VIK$$

where α is a coefficient. If the answer is NO, i.e. ZFLAG=0, flow proceeds to step S125.

At step S125, port output pressure reducing processing is carried out, and pressure reduction duration timer DECT is incremented, then, flow proceeds to a step S126.

At step S126, it is determined whether or not pressure reduction duration timer DECT is equal to or greater than pressure reduction pulse time GAW, or wheel acceleration WVD is greater than predetermined value F. If the answer is YES, i.e. DECT≧GAW or WVD>F, flow proceeds to a step S127 where output pressure holding control is carried out, and pressure reduction duration timer DECT is decremented, and one flow is finished. If the answer is NO, i.e. DECT<GAW and VwD≦F, one flow is finished.

Figure 9:
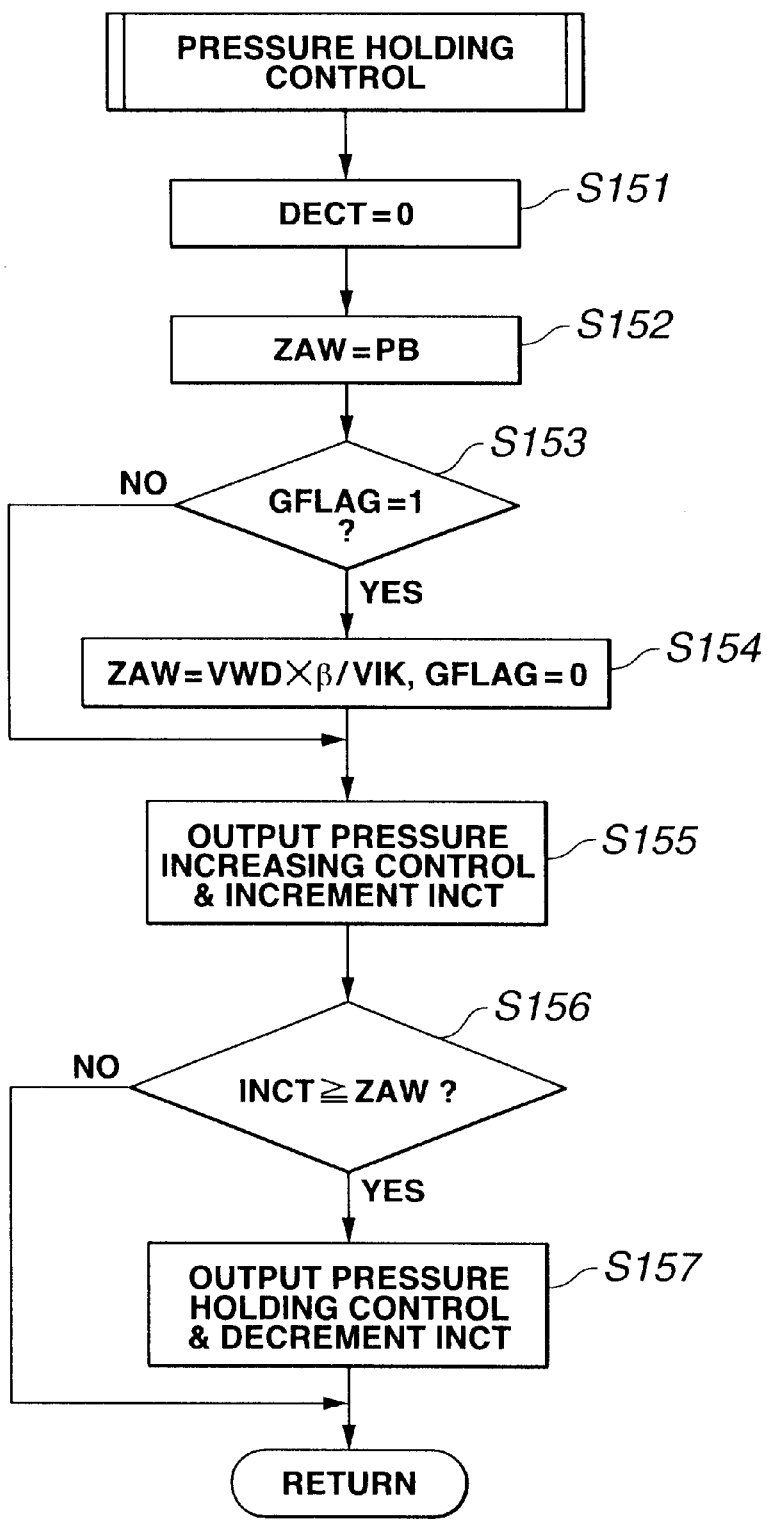
FIG. 9 is a chart similar to FIG. 8, showing the contents of pressure holding control.

Referring to FIG. 9, the specific contents of pressure holding control at step S15 in FIG. 3 will be described. First, at a step S151, pressure reduction time timer DECT is reset to zero. At a subsequent step S152, pressure increase pulse time ZAW is set at target pressure increase/reduction pulse time PB, then, flow proceeds to a step S153.

At step S153, it is determined whether or not pressure reduction execution flag GFLAG is set at 1. If the answer is YES, i.e. GFLAG=1, flow proceeds to a step S154 where pressure reduction pulse time GAW is obtained using following formula.

$$GAW=WVD \times \beta \times VIK$$

where β is a coefficient. After pressure reduction execution flag GFLAG is reset to zero, flow proceeds to a step S155. If the answer is NO, i.e. GFLAG=0, flow proceeds to step S155.

At step S155, port output pressure increasing processing is carried out, and pressure increase duration timer INCT is incremented, then, flow proceeds to a step S156.

At step S156, it is determined whether or not pressure increase duration timer INCT is equal to or greater than a pressure increase pulse time ZAW. If the answer is YES, i.e. INCT≧ZAW, flow proceeds to a step S157 where port output pressure holding processing is carried out, and pressure increase duration timer INCT is decremented, and one flow is finished. If the answer is NO, i.e. INCT<ZAW, one flow is finished directly.

Figure 10:
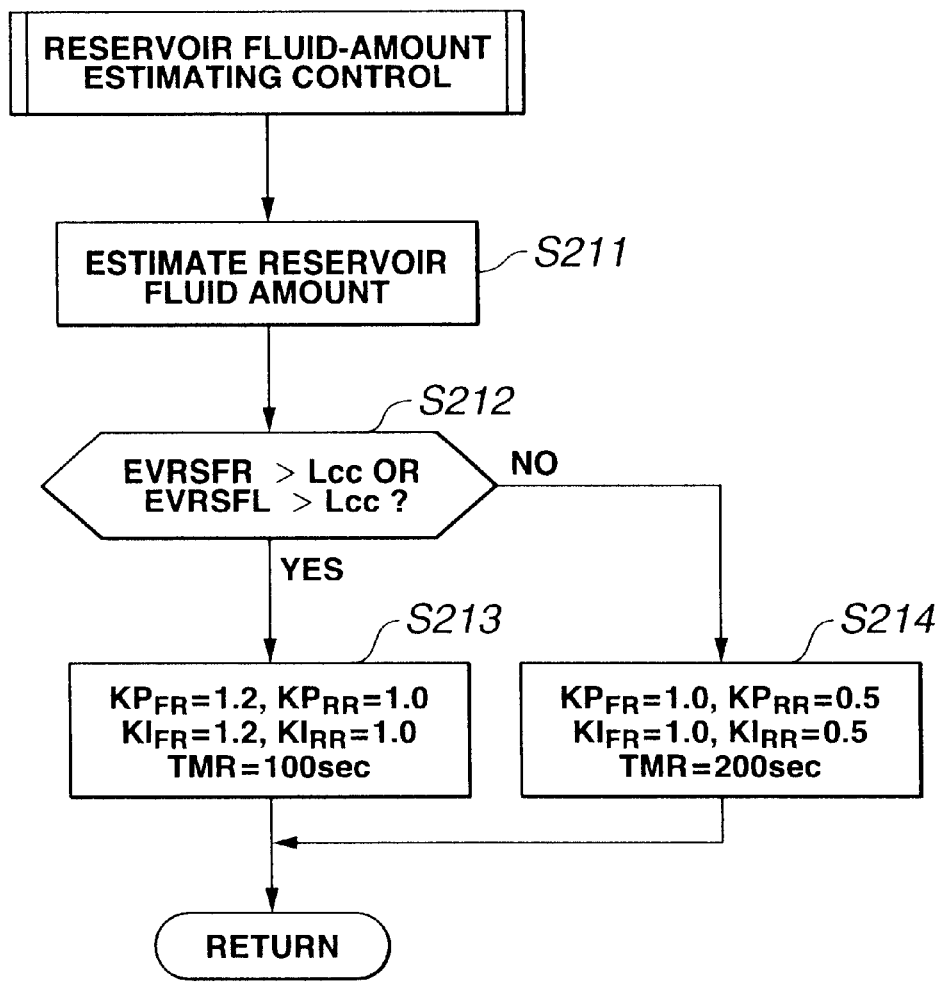
FIG. 10 is a chart similar to FIG. 9, showing the contents of reservoir fluid-amount estimating control.

Referring to FIG. 10, the specific contents of reservoir fluid-amount estimating control at step S21 in FIG. 3 will be described. First, at a step S211, the reservoir fluid amount is estimated. As the reservoir fluid-amount estimating method is known, the outline thereof will be explained. The characteristics of consumed fluid amount vs. pressure reduction for each wheel cylinder 50 are obtained in accordance with the characteristics of fluid pressure vs. consumed fluid amount and the characteristics of pressure reduction time vs. pressure reduction fluid pressure of wheel cylinders 50, and the fluid amount for every pressure reduction at each wheel is calculated in accordance with the wheel-lock fluid pressure and the pressure reduction pulse amount at each vehicle-body deceleration VIK, totalizing the pressure reduction fluid amount for each wheel of each brake fluid-pressure circuit. And the fluid amount in the two reservoirs 64, 64, i.e. estimated reservoir fluid amount EVRSFR, EVRSFL, is obtained in accordance with the total time of after start of antiskid brake control and the discharge capacity of hydraulic pump 66.

At a subsequent step S212, it is determined whether or not any of estimated reservoir fluid amount EVRSFR of one reservoir 64 and estimated reservoir fluid amount EVRSFL of another reservoir 64 is greater than a predetermined amount $L_{CC}$ (L<H). If the answer is NO, i.e. EVRSFR≦$L_{CC}$ and EVRSFL≦$L_{CC}$, there is no possibility of insufficient pressure reducing control, so that flow proceeds to a step S213 where deviation output pulse coefficients $KP_{FR}$, $KP_{RR}$, $KI_{FR}$, $KI_{RR}$ and motor actuation time set value TMR of hydraulic pump 66 are set at the following ordinary control values, and one flow is finished.

$$KP_{FR}=KI_{FR}=1.2$$

$$KP_{RR}=KI_{RR}=1.0$$

$$TMR=100 \text{ sec}$$

At step S212, if it is determined that the answer is YES, i.e. EVRSFR>$L_{CC}$ or EVRSFL>$L_{CC}$, there is a possibility of insufficient pressure reducing control, so that flow proceeds to a step S214 for reservoir fluid-amount control, where deviation output pulse coefficients $KP_{FR}$, $KP_{RR}$, $KI_{FR}$, $KI_{RR}$ and motor actuation time set value TMR of hydraulic pump 66 are set at the following correction control values, and one flow is finished.

$$KP_{FR}=KI_{FR}=1.0$$

$$KP_{RR}=KI_{RR}=0.5$$

$$TMR=200 \text{ sec}$$

Specifically, in reservoir fluid-amount control at step S214, by setting deviation output pulse coefficients $KP_{FR}$, $KP_{RR}$, $KI_{FR}$, $KI_{RR}$ at the correction control values smaller than the ordinary correction control values, target pressure increase/reduction pulse time PB (=PP+IP=KP×ΔWV+KI×ΔWV), maintaining thereby the empty capacity of the reservoir. And by setting motor actuation time set value TMR at a correction control value (200 sec) twice as large as the ordinary control value (100 sec), the amount discharged from reservoir 64 is increased, maintaining the empty capacity of the reservoir.

Figure 11:
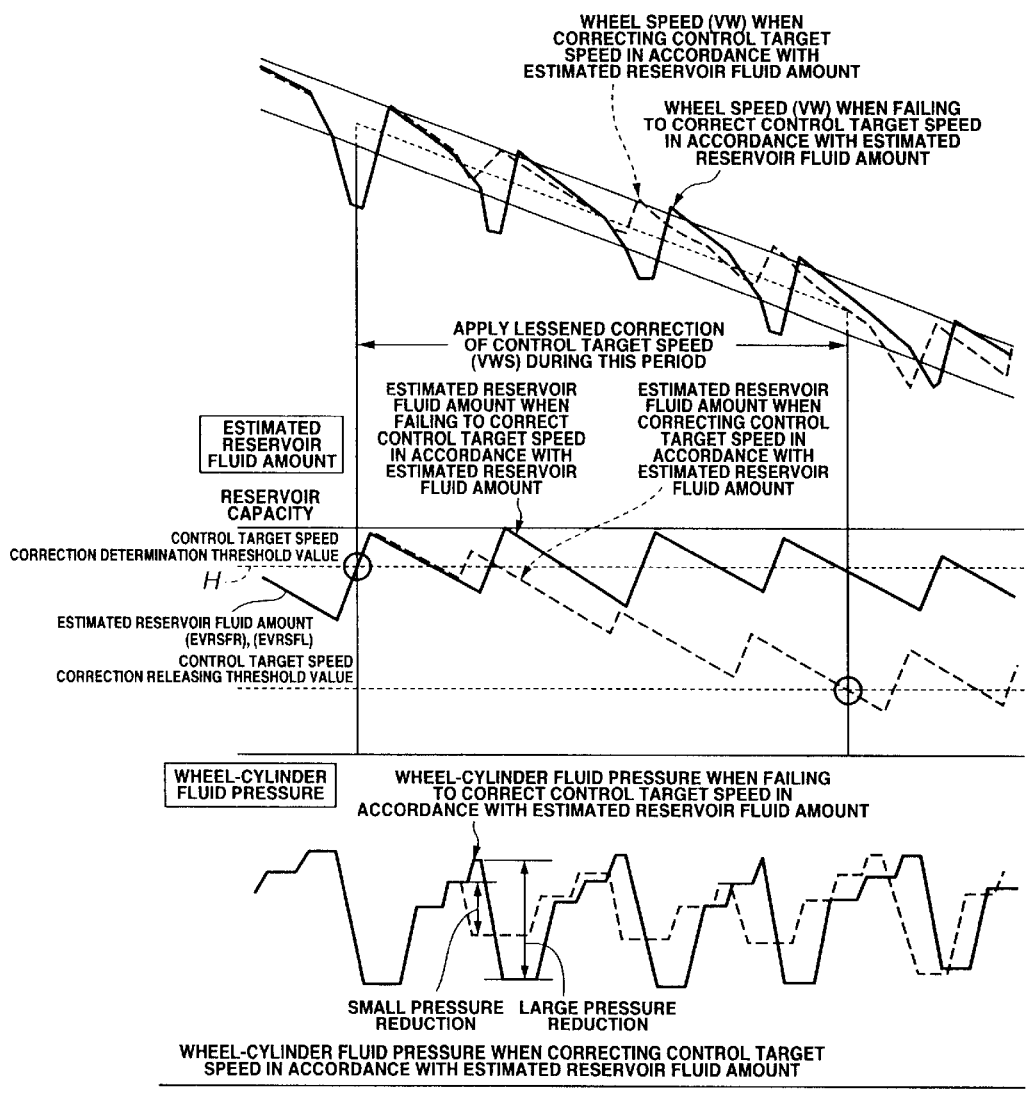
FIG. 11 is a time chart showing the contents of control in the antiskid brake control system.
Figure 12:
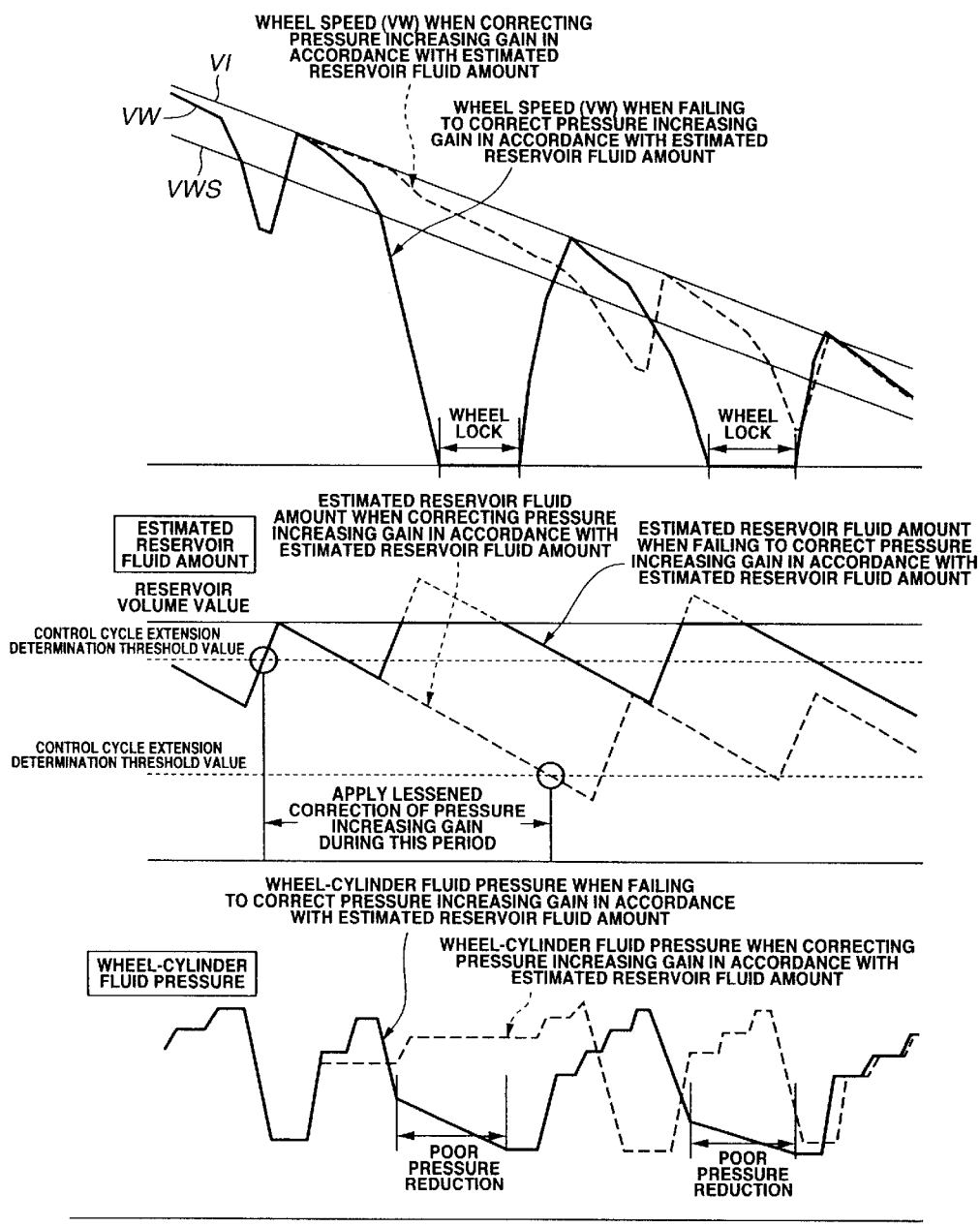
FIG. 12 is a chart similar to FIG. 11, showing the contents of control of pressure increase gain correction.

Referring next to FIGS. 11–12, operation of the first embodiment will be described. In the first embodiment, since the antiskid brake control system is constructed as described above, and thus the wheels may lock when wheel speeds WV of wheels 10, 14, 20, 21 sensed by wheel-speed sensors 12, 16, 24, 26 are smaller than control target speed WVS, ECU 40 switches switching valve 62 to the state of pressure reducing control for reducing the fluid pressure within wheel cylinder 50, lowering a braking force. Execution of pressure reducing control changes wheel speed WV from deceleration to acceleration, preventing wheel lock.

Then, when wheel acceleration WVD becomes smaller than zero through execution of the above pressure reducing control, switching valve 62 is switched to the state of pressure increasing control for increasing the fluid pressure within wheel cylinder 50, enhancing a braking force, thus preventing occurrence of insufficient deceleration of the vehicle body.

When at least one of estimated reservoir fluid amounts EVRSFR, EVRSFL of two reservoirs 64, 64 provided in the brake fluid-pressure circuits is greater than predetermined amount $H_{CC}$ or control target speed value correction determination threshold value, there is a possibility of insufficient pressure reducing control because of small empty capacity of the reservoir. Thus, as shown in broken line in FIG. 11, correction processing (step S36) is carried out to set control target speed WVS at a value obtained by subtracting 3 km/h from control target speed WVS.

Since correction of control target speed VMS allows pressure reducing control to start earlier before the slip ratio of the wheels becomes greater, the slip ratio of the wheels returns to an ordinary value in a short time, i.e. time for pressure reducing control is shorten, obtaining decreased reduction amount of fluid pressure within the wheel cylinder as shown in broken line in FIG. 11. Therefore, restraining a fluid-amount increase in reservoir 64 allows the empty capacity thereof to be maintained, preventing thereby insufficient pressure reducing control.

ON-OFF control of driving of electric motor M for driving hydraulic pump 66 requires no large electric motor with controllable current as electric motor M for driving hydraulic pump 66, enabling not only a reduction in size and manufacturing cost of the system, but prevention of feel degradation in terms of acoustic vibration performance.

No need to realize PWM control leads to no need to take countermeasures against radio noise and simplified circuit configuration, avoiding enlargement of ECU 40.

When at least one of estimated reservoir fluid amounts EVRSFR, EVRSFL of two reservoirs 64, 64 provided in the brake fluid-pressure circuits is greater than predetermined amount $L_{CC}$ or control-cycle extension determination threshold value, there is a possibility of insufficient pressure reducing control because of small empty capacity of the reservoir. Thus, deviation output pulse coefficients $KP_{FR}$, $KP_{RR}$, $KI_{FR}$, $KI_{RR}$ (=pressure increase gain) are corrected in the reducing direction with respect to ordinary control so as to reduce target pressure increase/reduction pulse time PB (=PP+IP=KP×ΔWV+K1×ΔWV). This lengthens time that the wheels fail to slip as shown in broken line in FIG. 12, and thus time that brake fluid discharged from reservoir 64 by hydraulic pump 66. Moreover, by setting motor actuation time set value TMR at a correction control value (200 sec) twice as large as the ordinary control value (100 sec), the amount discharged from reservoir 64 is increased, maintaining the empty capacity of the reservoir, thus preventing insufficient pressure reducing control.

Figure 13:
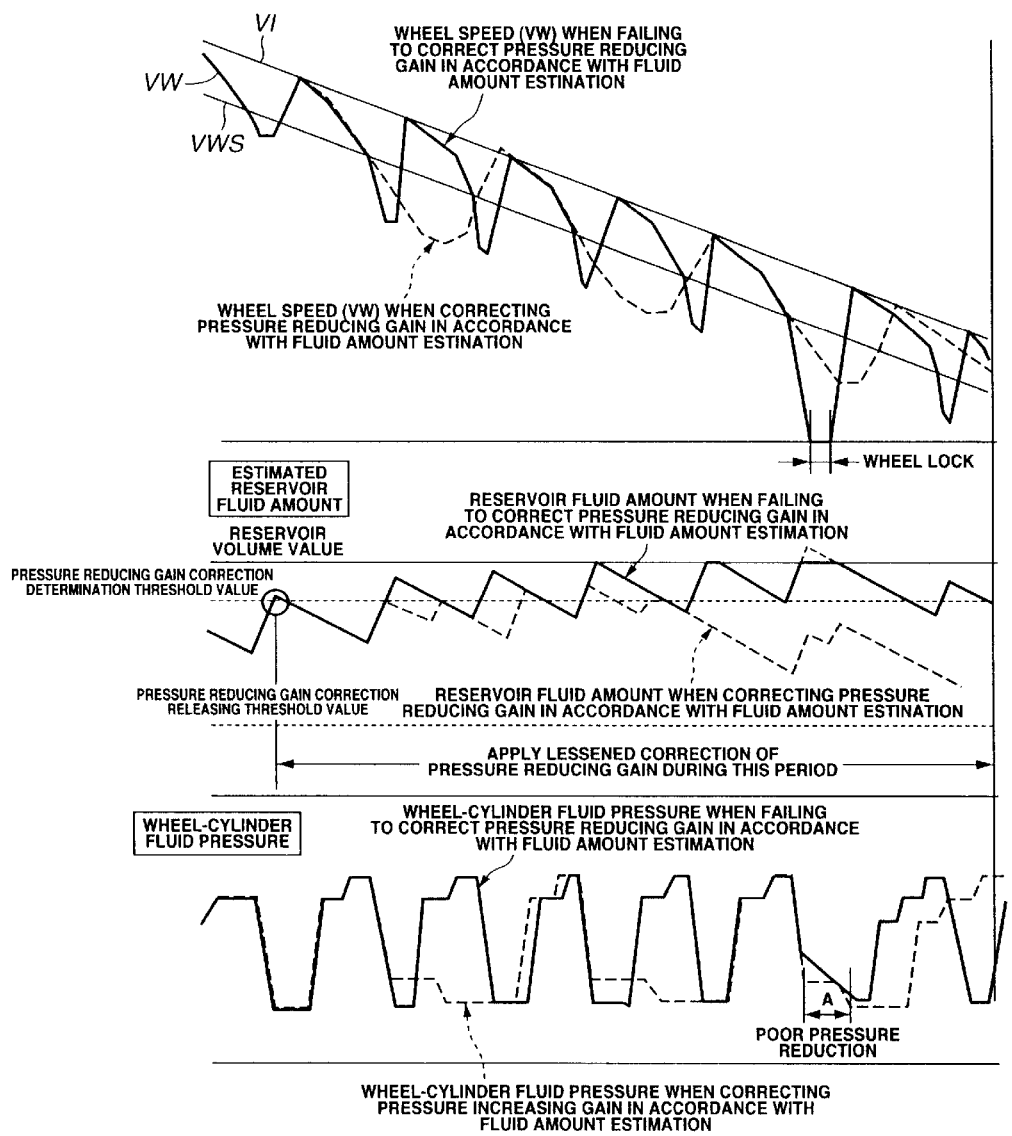
FIG. 13 is a chart similar to FIG. 12, showing the contents of control of pressure reducing gain correction.

Likewise, during pressure reducing control, deviation output pulse coefficients $KP_{FR}$, $KP_{RR}$, $KI_{FR}$, $KI_{RR}$ (=pressure increase gain) are corrected in the reducing direction with respect to ordinary control, so that, referring to FIG. 13, brake fluid stored in the reservoir fails to reach the reservoir capacity, enabling cancellation of insufficient pressure reducing control (refer to section A in FIG. 13).

When correcting deviation output pulse coefficients $KP_{FR}$, $KP_{RR}$, $KI_{FR}$, $KI_{RR}$ (=pressure increase gain) during pressure increasing control in the reducing direction with respect to ordinary control, the distribution is performed so that the correction amount of the rear wheels which are lower in braking efficiency than the front wheels is larger than the correction amount of the front wheels (reduction in pressure increase amount=reduction in braking force). As compared with simultaneous correction for pressure increasing control of the front and rear wheels, this allows the reservoir empty capacity to be controlled while restraining lowering of a braking force of the whole vehicle, preventing insufficient pressure reducing control.

Figure 14:
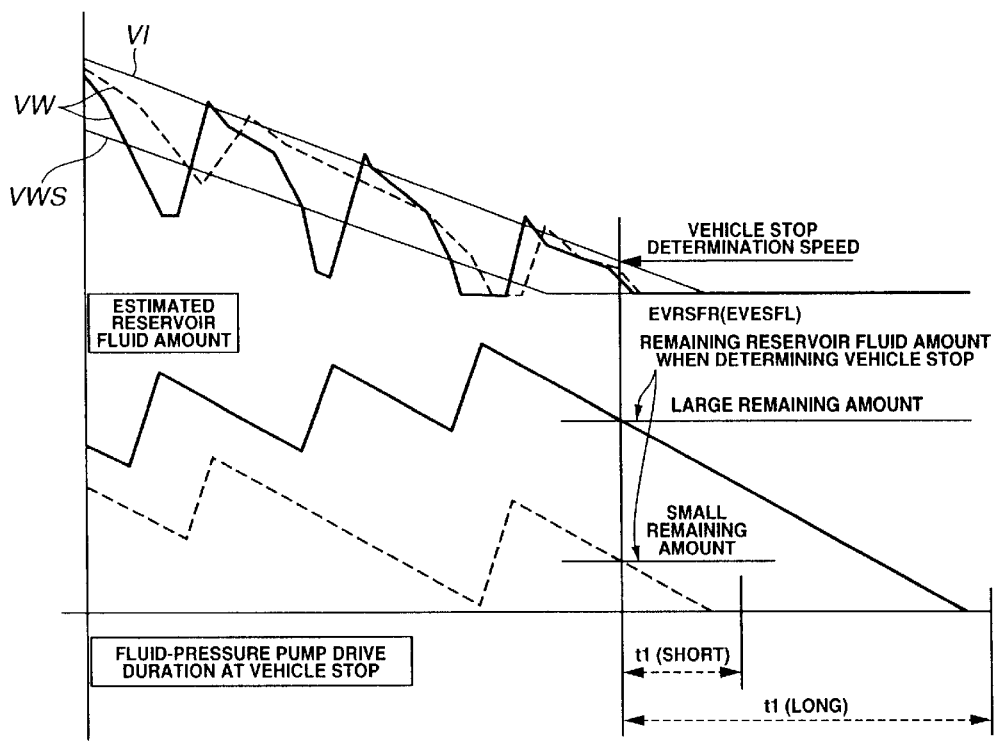
FIG. 14 is a chart similar to FIG. 13, showing a second embodiment of the present invention.

Referring next to FIG. 14, a second embodiment of the present invention will be described. The second embodiment shows another example of reservoir fluid-amount control in the antiskid brake control system in the first embodiment. Another reservoir fluid-amount control can be carried out solely in the second embodiment or in combination with the first embodiment. Therefore, the second embodiment is explained only with regard to a difference from or addition to the first embodiment.

In the second embodiment, reservoir fluid-amount controlling means comprise post-vehicle-stop hydraulic pump driving means for driving hydraulic pump 66 or electric motor M during a predetermined time after vehicle stop, and post-vehicle-stop hydraulic pump driving time setting means for variably setting the driving time of hydraulic pump 66 by the post-vehicle-stop hydraulic pump driving means in accordance with estimated reservoir fluid amounts EVRSFR, EVRSFL at vehicle stop, which are estimated in the reservoir fluid-amount estimating means (step S211 in FIG. 10).

Referring to FIG. 14, the specific contents of the reservoir fluid-amount controlling means in the second embodiment will be described. When the vehicle reaches a vehicle-stop determination speed, hydraulic pump 66 or electric motor M is driven during a driving time t1, t2 variably set in post-vehicle-stop hydraulic pump driving time setting means in accordance with estimated reservoir fluid-amounts EVRSFR, EVRSFL at vehicle stop.

Therefore, every vehicle stop, hydraulic pump 66 is driven during a predetermined time to maintain the empty capacity of the reservoir, preventing thereby insufficient pressure reducing control.

The driving time of hydraulic pump 66 by the post-vehicle-stop hydraulic pump driving means is variably set in accordance with reservoir fluid-amounts EVRSFR, EVRSFL at vehicle-stop determination, which are estimated in the reservoir fluid-amount estimating means. This can not only ensure an empty condition of reservoir 64, but remove useless rotation of hydraulic pump 66 due to vehicle stop, resulting in improved feel in terms of acoustic vibration performance.

Having described the present invention in connection with the illustrative embodiments, it is noted that the present invention is not limited thereto, and various changes and modifications can be made without departing from the scope of the present invention.

With the antiskid brake control system according to the present invention, when the estimated fluid amount in the reservoir is greater than a predetermined value, the target wheel speed is corrected to lessen the slip ratio. Since this correction allows pressure reducing control to start before the slip ratio becomes greater, the slip ratio returns to an ordinary value in a short time, i.e. time for pressure reducing control is shorten, obtaining decreased reduction amount of fluid pressure. Therefore, restraining a fluid-amount increase in the reservoir allows the empty capacity thereof to be controlled, preventing thereby insufficient pressure reducing control. Moreover, ON-OFF control of driving of the electric motor for driving the pump requires no large electric motor with controllable current as electric motor for driving the pump, enabling not only a reduction in size and manufacturing cost of the system, but prevention of feel degradation in terms of acoustic vibration performance. Moreover, no need to realize PWM control leads to no need to take countermeasures against radio noise and simplified circuit configuration, avoiding enlargement of the ECU.

Further, with the antiskid brake control system according to the present invention, when the estimated fluid amount in the reservoir is greater than a predetermined value, a pressure increase amount per unit time in pressure increasing control is reduced. This correction lengthens time that the wheels fail to slip, i.e. time that the wheel speed becomes smaller than a control target speed to start pressure reducing control, and thus time that brake fluid discharged from the reservoir by the pump. Therefore, the empty capacity of the reservoir can be controlled to prevent insufficient pressure reducing control.

Still further, with the antiskid brake control system according to the present invention, when the estimated fluid amount in the reservoir is greater than a predetermined value, a pressure reduction amount per unit time in pressure reducing control is reduced. Therefore, reducing fluid discharged to the reservoir allows the empty capacity thereof to be controlled, preventing thereby insufficient pressure reducing control.

Furthermore, with the antiskid brake control system according to the present invention, in the case that when the estimated fluid amount in the reservoir is greater than a predetermined value, a pressure reduction amount per unit time in pressure increasing control is reduced, the reduced pressure increase amount is greater in the rear wheels having lower braking efficiency than in the front wheels. Therefore, this allows the reservoir empty capacity to be controlled while restraining lowering of a braking force of the whole vehicle, preventing insufficient pressure reducing control.

Furthermore, with the antiskid brake control system according to the present invention, a duration for driving the pump after vehicle stop is set in accordance with the estimated fluid amount in the reservoir. Therefore, the empty capacity of the reservoir can be controlled to prevent insufficient pressure reducing control.

What is claimed is:

1. A brake control system for a motor vehicle, comprising:
   a sensor which senses a speed of a corresponding one of wheels;
   a hydraulic unit which allows increase and reduction in a fluid pressure within a wheel cylinder provided to the wheel, the hydraulic unit comprising a reservoir for storing a fluid discharge from the wheel cylinder during pressure reduction; and
   an electronic control unit (ECU) connected to the sensor and the hydraulic unit, the ECU being so constructed as to:
   calculate a pseudo vehicle-body speed in accordance with the sensed wheel speed;
   calculate a target speed of the wheel in view of a predetermined slip ratio obtained in accordance with the calculated pseudo vehicle-body speed;
   carry out a pressure reducing control by reducing the fluid pressure within the hydraulic unit when the sensed wheel speed is smaller than the calculated target wheel speed;
   estimate an amount of the fluid stored in the reservoir; and
   correct the target wheel speed to lessen the slip ratio when the estimated fluid amount is greater than a predetermined value.

2. A brake control system for a motor vehicle, comprising:
   a sensor which senses a speed of a corresponding one of wheels;
   a hydraulic unit which allows increase and reduction in a fluid pressure within a wheel cylinder provided to the wheel, the hydraulic unit comprising a reservoir for storing a fluid discharge from the wheel cylinder during pressure reduction; and
   an electronic control unit (ECU) connected to the sensor and the hydraulic unit, the ECU being so constructed as to:
   calculate a pseudo vehicle-body speed in accordance with the sensed wheel speed;
   calculate a target speed of the wheel in view of a predetermined slip ratio obtained in accordance with the calculated pseudo vehicle-body speed;
   carry out a pressure increasing control and a pressure reducing control in accordance with the calculated target wheel speed, the pressure increasing control being achieved by increasing the fluid pressure within the hydraulic unit, the pressure reducing control being achieved by reducing the fluid pressure within the hydraulic unit;
   estimate an amount of the fluid stored in the reservoir; and
   reduce a pressure increase amount per unit time in the pressure increasing control when the estimated fluid amount is greater than a predetermined value.

3. The brake control system as claimed in claim 2, wherein the ECU is so constructed further as to reduce a pressure reduction amount per unit time in the pressure reducing control when the estimated fluid amount is greater than the predetermined value.

4. The brake control system as claimed in claim 2, wherein the reduced pressure increase amount is greater in the rear wheels than in the front wheels.

5. The brake control system as claimed in claim 3, wherein the reduced pressure reduction amount is greater in the rear wheels than in the front wheels.

6. A brake control system for a motor vehicle, comprising:
   a source of a fluid pressure;
   a hydraulic unit which allows increase and reduction in a fluid pressure within a wheel cylinder provided to each of wheels, the hydraulic unit comprising a reservoir for storing a fluid discharge from the wheel cylinder during pressure reduction and a pump for returning the fluid stored in the reservoir to the source;
   a sensor which senses a speed of the wheel;
   an electronic control unit (ECU) connected to the hydraulic unit and the sensor, the ECU being so constructed as to:
   calculate a pseudo vehicle-body speed in accordance with the sensed wheel speed;
   calculate a target speed of the wheel in view of a predetermined slip ratio obtained in accordance with the calculated pseudo vehicle-body speed;
   carry out a pressure reducing control by reducing the fluid pressure within the hydraulic unit when the sensed wheel speed is smaller than the calculated target wheel speed;
   estimate an amount of the fluid stored in the reservoir; and
   set a duration for driving the pump after vehicle stop in accordance with the estimated fluid amount.

7. A brake control system for a motor vehicle, comprising:
   a master cylinder which produces a fluid pressure;

a braking cylinder provided to each of wheels, the braking cylinder producing a braking force to each wheel by means of the fluid pressure derived from the master cylinder;

a switching valve which allows switching between a pressure reducing control, a pressure holding control, and a pressure increasing control, each control being involved in the fluid pressure within the braking cylinder;

a reservoir which stores a fluid discharged from the braking cylinder during the pressure reducing control;

a pump which returns the fluid stored in the reservoir to the master cylinder;

a sensor which senses a speed of the wheel; and an electronic control unit (ECU) connected to the braking cylinder and the switching valve, the ECU being so constructed as to:

calculate a pseudo vehicle-body speed in accordance with the sensed wheel speed;

calculate a target speed of the wheel in view of a predetermined slip ratio obtained in accordance with the calculated pseudo vehicle-body speed;

calculate a deceleration of the wheel;

carry out a pressure reducing control and a pressure increasing control through the switching valve, the pressure reducing control being carried out when the sensed wheel speed reaches the calculated target wheel speed, the pressure increasing control being carried out when the sensed wheel speed recovers to the pseudo vehicle-body speed;

carry out ON-OFF control of driving of the pump;

estimate an amount of the fluid stored in the reservoir; and correct the target wheel speed to lessen the slip ratio when the estimated fluid amount is greater than a predetermined value.

8. A brake control system for a motor vehicle, comprising:

a master cylinder which produces a fluid pressure;

a braking cylinder provided to each of wheels, the braking cylinder producing a braking force to each wheel by means of the fluid pressure derived from the master cylinder;

a switching valve which allows switching between a pressure reducing control, a pressure holding control, and a pressure increasing control, each control being involved in the fluid pressure within the braking cylinder;

a reservoir which stores a fluid discharged from the braking cylinder during the pressure reducing control;

a pump which returns the fluid stored in the reservoir to the master cylinder;

a sensor which senses a speed of the wheel; and an electronic control unit (ECU) connected to the braking cylinder and the switching valve, the ECU being so constructed as to:

calculate a pseudo vehicle-body speed in accordance with the sensed wheel speed;

calculate a target speed of the wheel in view of a predetermined slip ratio obtained in accordance with the calculated pseudo vehicle-body speed;

calculate a deceleration of the wheel;

carry out a pressure reducing control and a pressure increasing control through the switching valve, the pressure reducing control being carried out when the sensed wheel speed reaches the calculated target wheel speed, the pressure increasing control being carried out when the sensed wheel speed recovers to the pseudo vehicle-body speed;

carry out ON-OFF control of driving of the pump;

estimate an amount of the fluid stored in the reservoir; and reduce a pressure increase amount per unit time in the pressure increasing control when the estimated fluid amount is greater than a predetermined value.

9. The brake control system as claimed in claim 8, wherein the ECU is so constructed further as to reduce a pressure reduction amount per unit time in the pressure reducing control when the estimated fluid amount is greater than the predetermined value.

10. The brake control system as claimed in claim 8, wherein the reduced pressure increase amount is greater in the rear wheels than in the front wheels.

11. The brake control system as claimed in claim 9, wherein the reduced pressure reduction amount is greater in the rear wheels than in the front wheels.

12. A brake control system for a motor vehicle, comprising:

a master cylinder which produces a fluid pressure;

a braking cylinder provided to each of wheels, the braking cylinder producing a braking force to each wheel by means of the fluid pressure derived from the master cylinder;

a switching valve which allows switching between a pressure reducing control, a pressure holding control, and a pressure increasing control, each control being involved in the fluid pressure within the braking cylinder;

a reservoir which stores a fluid discharged from the braking cylinder during the pressure reducing control;

a pump which returns the fluid stored in the reservoir to the master cylinder;

a sensor which senses a speed of the wheel; and an electronic control unit (ECU) connected to the braking cylinder and the switching valve, the ECU being so constructed as to:

calculate a pseudo vehicle-body speed in accordance with the sensed wheel speed;

calculate a target speed of the wheel in view of a predetermined slip ratio obtained in accordance with the calculated pseudo vehicle-body speed;

calculate a deceleration of the wheel;

carry out a pressure reducing control and a pressure increasing control through the switching valve, the pressure reducing control being carried out when the sensed wheel speed reaches the calculated target wheel speed, the pressure increasing control being carried out when the sensed wheel speed recovers to the pseudo vehicle-body speed;

carry out ON-OFF control of driving of the pump;

estimate an amount of the fluid stored in the reservoir; and set a duration for driving the pump after vehicle stop in accordance with the estimated fluid amount.

13. A brake control system for a motor vehicle, comprising:

a master cylinder which produces a fluid pressure;

a braking cylinder provided to each of wheels, the braking cylinder producing a braking force to each wheel by means of the fluid pressure derived from the master cylinder;

a switching valve which allows switching between a pressure reducing control, a pressure holding control, and a pressure increasing control, each control being involved in the fluid pressure within the braking cylinder;

a reservoir which stores a fluid discharged from the braking cylinder during the pressure reducing control;

a pump which returns the fluid stored in the reservoir to the master cylinder;

a sensor which senses a speed of the wheel; and an electronic control unit (ECU) connected to the braking cylinder and the switching valve, the ECU comprising:

means for calculating a pseudo vehicle-body speed in accordance with the sensed wheel speed;

means for calculating a target speed of the wheel in view of a predetermined slip ratio obtained in accordance with the calculated pseudo vehicle-body speed;

means for calculating a deceleration of the wheel;

means for carrying out a pressure reducing control and a pressure increasing control through the switching valve, the pressure reducing control being carried out when the sensed wheel speed reaches the calculated target wheel speed, the pressure increasing control being carried out when the sensed wheel speed recovers to the pseudo vehicle-body speed;

means for carrying out ON-OFF control of driving of the pump;

means for estimating an amount of the fluid stored in the reservoir; and means for correcting the target wheel speed to lessen the slip ratio when the estimated fluid amount is greater than a predetermined value.

14. A brake control system for a motor vehicle, comprising:

a master cylinder which produces a fluid pressure;

a braking cylinder provided to each of wheels, the braking cylinder producing a braking force to each wheel by means of the fluid pressure derived from the master cylinder;

a switching valve which allows switching between a pressure reducing control, a pressure holding control, and a pressure increasing control, each control being involved in the fluid pressure within the braking cylinder;

a reservoir which stores a fluid discharged from the braking cylinder during the pressure reducing control;

a pump which returns the fluid stored in the reservoir to the master cylinder;

a sensor which senses a speed of the wheel; and an electronic control unit (ECU) connected to the braking cylinder and the switching valve, the ECU comprising:

means for calculating a pseudo vehicle-body speed in accordance with the sensed wheel speed;

means for calculating a target speed of the wheel in view of a predetermined slip ratio obtained in accordance with the calculated pseudo vehicle-body speed;

means for calculating a deceleration of the wheel;

means for carrying out a pressure reducing control and a pressure increasing control through the switching valve, the pressure reducing control being carried out when the sensed wheel speed reaches the calculated target wheel speed, the pressure increasing control being carried out when the sensed wheel speed recovers to the pseudo vehicle-body speed;

means for carrying out ON-OFF control of driving of the pump;

means for estimating an amount of the fluid stored in the reservoir; and means for reducing a pressure increase amount per unit time in the pressure increasing control when the estimated fluid amount is greater than a predetermined value.

15. A brake control system for a motor vehicle, comprising:

a master cylinder which produces a fluid pressure;

a braking cylinder provided to each of wheels, the braking cylinder producing a braking force to each wheel by means of the fluid pressure derived from the master cylinder;

a switching valve which allows switching between a pressure reducing control, a pressure holding control, and a pressure increasing control, each control being involved in the fluid pressure within the braking cylinder;

a reservoir which stores a fluid discharged from the braking cylinder during the pressure reducing control;

a pump which returns the fluid stored in the reservoir to the master cylinder;

a sensor which senses a speed of the wheel; and an electronic control unit (ECU) connected to the braking cylinder and the switching valve, the ECU comprising:

means for calculating a pseudo vehicle-body speed in accordance with the sensed wheel speed;

means for calculating a target speed of the wheel in view of a predetermined slip ratio obtained in accordance with the calculated pseudo vehicle-body speed;

means for calculating a deceleration of the wheel;

means for carrying out a pressure reducing control and a pressure increasing control through the switching valve, the pressure reducing control being carried out when the sensed wheel speed reaches the calculated target wheel speed, the pressure increasing control being carried out when the sensed wheel speed recovers to the pseudo vehicle-body speed;

means for carrying out ON-OFF control of driving of the pump;

means for estimating an amount of the fluid stored in the reservoir; and means for setting a duration for driving the pump after vehicle stop in accordance with the estimated fluid amount.

* * * * *